(12) United States Patent
Pan et al.

(10) Patent No.: US 11,832,588 B2
(45) Date of Patent: Dec. 5, 2023

(54) PET HAIR REMOVAL COMB

(71) Applicant: Ningbo Hongdu Model Plastics Co., Ltd., Ningbo (CN)

(72) Inventors: Zhongjie Pan, Ningbo (CN); Jinchun Zhang, Ningbo (CN); Chengchao Zhang, Ningbo (CN)

(73) Assignee: NINGBO HONGDU MODEL PLASTICS CO., LTD., Ningbo (CN)

( * ) Notice: Subject to any disclaimer, the term of this patent is extended or adjusted under 35 U.S.C. 154(b) by 0 days.

(21) Appl. No.: 17/830,344

(22) Filed: Jun. 2, 2022

(65) Prior Publication Data
US 2022/0386565 A1 Dec. 8, 2022

(30) Foreign Application Priority Data
Jun. 2, 2021 (CN) .......................... 202110616044.7

(51) Int. Cl.
*A01K 13/00* (2006.01)

(52) U.S. Cl.
CPC .................................. *A01K 13/002* (2013.01)

(58) Field of Classification Search
CPC .. A01K 13/002; A46B 17/06; A46B 15/0055; A46B 15/0081; A45D 24/40; A45D 24/41; A45D 24/42; A45D 24/43; A45D 24/44
USPC .............. 15/104.5, 104.51, 104.52; 119/625; 132/119
See application file for complete search history.

(56) References Cited

U.S. PATENT DOCUMENTS

| 7,077,076 B2 | 7/2006 | Porter et al. | |
| 2009/0126648 A1* | 5/2009 | Porter | A01K 13/002 119/601 |
| 2010/0294210 A1* | 11/2010 | Dyson | A47L 9/0653 15/415.1 |
| 2011/0067644 A1* | 3/2011 | Prochaska | A01K 13/002 119/633 |
| 2011/0259281 A1* | 10/2011 | Mak | A01K 13/002 29/428 |
| 2012/0060311 A1* | 3/2012 | Wang | A46B 17/06 15/168 |

(Continued)

FOREIGN PATENT DOCUMENTS

| CN | 108990827 A | 12/2018 | |
| WO | 2018224993 A1 | 12/2018 | |
| WO | WO-2020253261 A1 * | 12/2020 | ............. A01K 13/00 |

*Primary Examiner* — Brady W Frazier
*Assistant Examiner* — Zoe Tam Tran
(74) *Attorney, Agent, or Firm* — Bayramoglu Law Offices LLC

(57) ABSTRACT

A pet hair removal comb includes a comb head with a knife holder assembly, a handle assembly and a hair removal push plate. The comb head is mounted at a front end of the handle assembly; the hair removal push plate is mounted on the comb head and located at a back side of the knife holder assembly; the handle assembly is provided thereon with a button assembly; the hair removal push plate includes a push plate that is movable in up and down directions and a push part at a front end of the push plate; a connecting rod is provided between the button assembly and a back surface of the push plate; two ends of the connecting rod are respectively movably connected with the button assembly and the push plate; the button assembly slides to push, through the connecting rod, the push plate to move.

8 Claims, 5 Drawing Sheets

(56) References Cited

U.S. PATENT DOCUMENTS

| | | | |
|---|---|---|---|
| 2015/0059656 A1* | 3/2015 | Jui-Tsang | A46B 17/06 15/160 |
| 2017/0295753 A1* | 10/2017 | Cathaud | A46B 7/023 |
| 2020/0196570 A1* | 6/2020 | Di | A01K 13/002 |

* cited by examiner

PET HAIR REMOVAL COMB

CROSS REFERENCE TO THE RELATED APPLICATIONS

This application is based upon and claims priority to Chinese Patent Application No. 202110616044.7, filed on Jun. 2, 2021, the entire contents of which are incorporated herein by reference.

TECHNICAL FIELD

The present disclosure relates to a pet grooming tool, in particular to a pet comb for removing shed or knotted hair of a pet.

BACKGROUND

With the improvement of living standards, more and more people raise pets, and pets have become a part of people's lives.

Pets usually tend to shed hair. There are grooming tools on the market that are specially designed to clean the pet's shed hair or neatly comb the pet's hair. The grooming tool has a comb on the head and a row of comb teeth on the comb. However, the pet's hair often appears knotted, and the traditional pet comb will get stuck in the knotted hair when combing the pet's hair.

In order to solve the above technical problem, U.S. Pat. No. 7,077,076B2 (Document 1) discloses a pet grooming tool. It includes a comb with a blade edge. A front end of the comb is provided with comb teeth, and a root portion of the comb teeth is provided with the blade edge for cutting knotted hair. When the tool grooms the pet, the blade edge cuts knotted hair, such that the comb teeth can smoothly comb the pet's hair.

Chinese Patent CN108990827A (Document 2) discloses a pet comb and a hair removal mechanism. In this disclosure, a hair removal part is provided, including a push part that is movable between a root portion and a front end of comb teeth. The push part includes a back push part for removing hair from the back side of the strip-shaped comb teeth and gap push parts for removing hair from gaps between the comb teeth. Tooth gaps are provided between the gap push parts on the push part, to allow the strip-shaped comb teeth to pass through.

A button is connected with a push plate and the push part through a rotating member, and the push plate may be controlled to move up and down by a forward and backward sliding of the button. Because the rotating member is movably connected with the button and the push plate, there is a certain gap between the rotating member and the button or the push plate. When a user operates the comb, the force applied by the finger on the button is transmitted to the hair removal push part, which is delayed due to the gap. In addition, the hair removal push plate of the traditional comb is reset by a spring. When the hair removal push plate is pushed, the push force gradually increases, and the finger is prone to fatigue after long-term use, which causes poor user experience.

SUMMARY

The technical problem to be solved by the present disclosure is to provide a pet hair removal comb pushing a hair removal push plate through a button, which features sensitive response and effort-saving starting, and can improve the user's hair combing experience.

In order to solve the above technical problem, the present disclosure adopts the following technical solution. The pet hair removal comb includes a comb head mounted with a knife holder assembly, a handle assembly and a hair removal push plate, wherein the comb head is provided at a front end of the handle assembly; the hair removal push plate is provided on the comb head and located at a back side of the knife holder assembly;

the handle assembly is provided thereon with a button assembly that is slidable in front and back directions; the hair removal push plate includes a push plate that is movable in up and down directions and a push part provided at a front end of the push plate;

a connecting rod is provided between the button assembly and a back surface of the push plate; two ends of the connecting rod are respectively movably connected with the button assembly and the push plate; the button assembly is configured to slide to push, through the connecting rod, the push plate to move;

the connecting rod is arranged with a force applying arm; a back surface of the hair removal push plate is provided with an arc force-bearing surface; a front end of the force applying arm is pressed tightly on the arc force-bearing surface; when the button assembly slides forward and backward, the front end of the force applying arm is slidable in close contact on the arc force-bearing surface.

In a further preferred embodiment of the present disclosure, the front end of the force applying arm may be provided with a first cylinder; the first cylinder may be tightly pressed on the arc force-bearing surface.

In a further preferred embodiment of the present disclosure, the connecting rod may include two connecting arms and a back arm; the force applying arm may be located at a central position between the two connecting arms; a front end of each of the connecting arms may be provided with a second cylinder; a back end of the back arm may be provided with a third cylinder; the second cylinder passes through a coupling hole of a coupling socket provided on the back surface of the push plate; the third cylinder may be engaged in a groove of the button assembly.

In a further preferred embodiment of the present disclosure, the button assembly may include a button slidable on a surface of the handle assembly, and a connecting lock member; the button may be connected with the connecting lock member; the groove may be provided on the connecting lock member.

In a further preferred embodiment of the present disclosure, the front end of the force applying arm may be located above the front end of the connecting rod; a connecting line of a center point of the first cylinder and a center point of the third cylinder and a connecting line of a center point of the second cylinder and the center point of the third cylinder define an angle A.

In a further preferred embodiment of the present disclosure, the arc force-bearing surface and the second cylinder have the same center.

In a further preferred embodiment of the present disclosure, the comb head may include a shell; two return springs may be arranged between the shell and the push plate.

In a further preferred embodiment of the present disclosure, the knife holder assembly may include a plate-shaped base and a row of strip-shaped metal comb teeth at a front end of the plate-shaped base.

In a further preferred embodiment of the present disclosure, the push part may include a gap push part for removing hair from gaps between the comb teeth.

In a further preferred embodiment of the present disclosure, the shell may include a bottom shell connected with the handle assembly, and a head cover; the bottom shell and the head cover may be fixed by a fastener.

Compared with the prior art, the present disclosure has the following advantages. A force applying arm is provided on the connecting rod between the button assembly and the push plate, and the front end of the force applying arm is pressed tightly on the arc force-bearing surface of the push plate. When the button assembly slides in front and back directions, the front end of the force applying arm is slidable in close contact on the arc-bearing arc surface, such that the force applied on the button assembly is transmitted to the hair removal push plate without delay. Therefore, the present disclosure achieves timely response and improves the user's experience of using the pet hair removal comb.

Because the force applying arm bears part of the force of the connecting rod on the push plate, the process of driving the push plate through the connecting rod by the button assembly is more effort-saving. Especially when the button assembly is in a starting position, the effort-saving effect is more obvious. As the inclination of the connecting rod and the force applying arm increases, the effort-saving effect decreases.

DETAILED DESCRIPTION OF THE EMBODIMENTS

The present disclosure will be described in further detail below with reference to the accompanying drawings and examples.

Pet comb is a pet hair grooming tool, which can be used to comb pet hair, cut knotted pet hair, or thin too dense pet hair.

Figure 1:
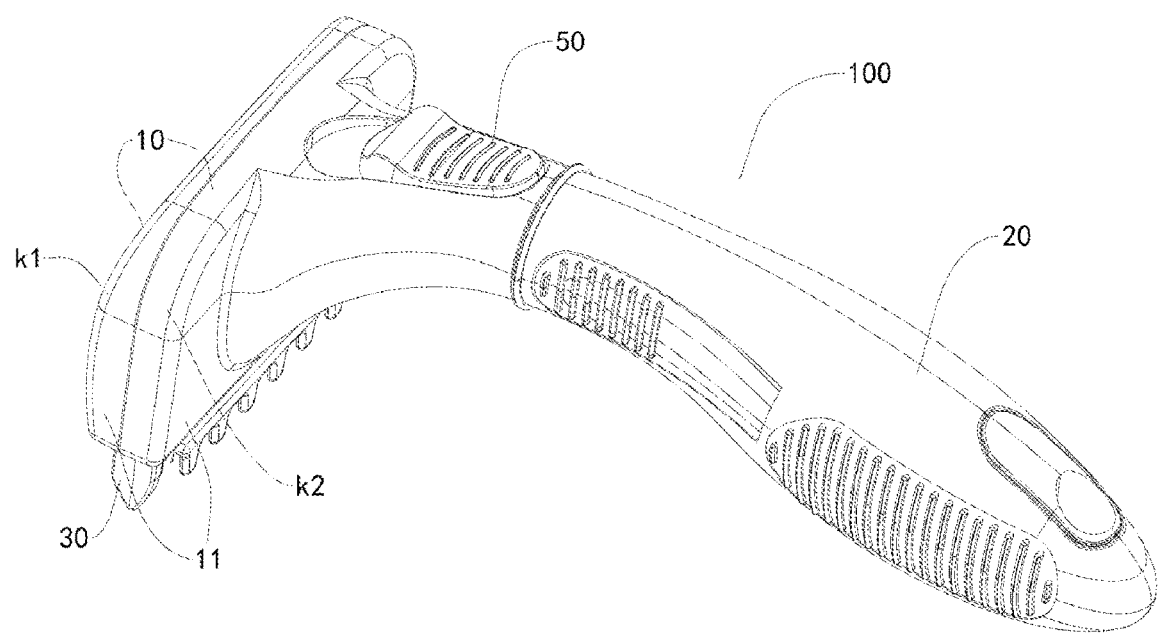
FIG. 1 is an overall structure view of a pet hair removal comb.
Figure 2:
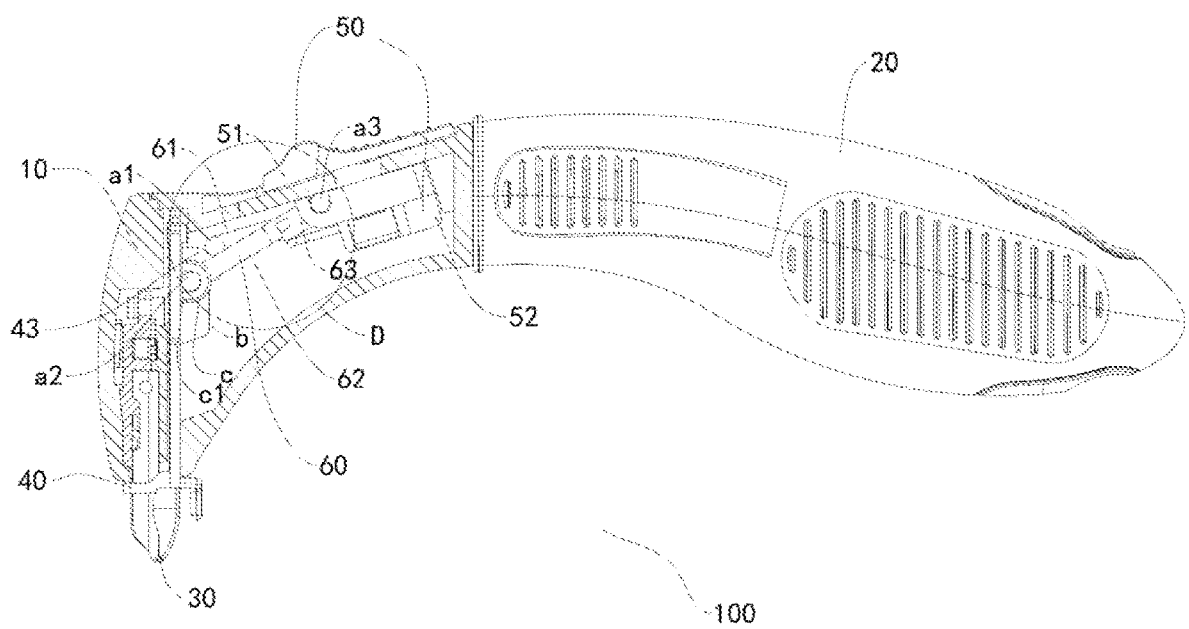
FIG. 2 is a first lateral sectional view of a pet hair removal comb.
Figure 3:
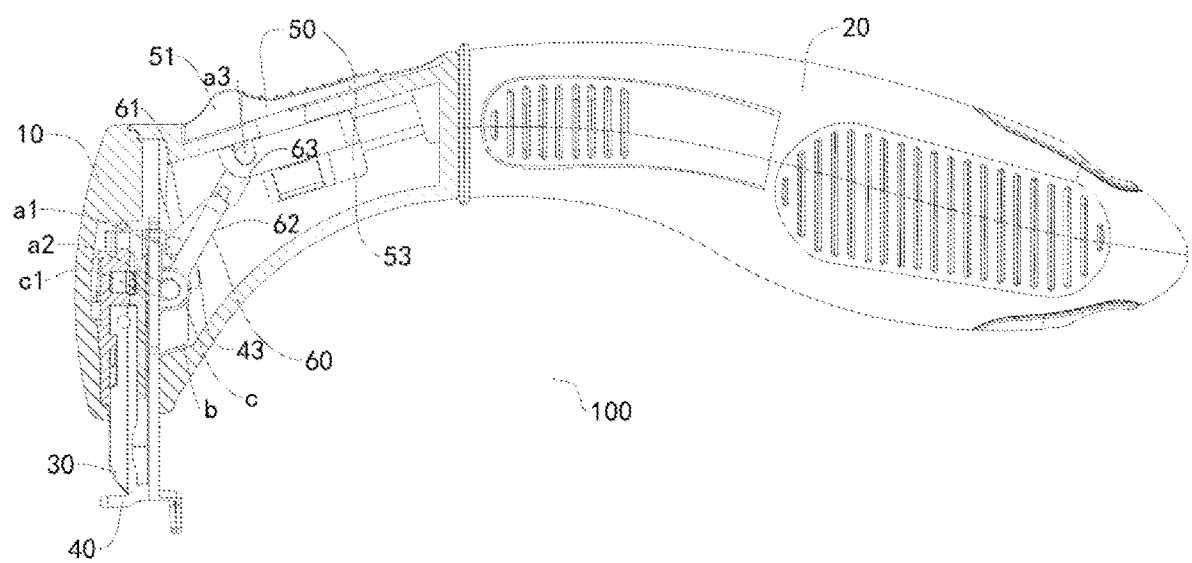
FIG. 3 is a second lateral sectional view of a pet hair removal comb.
Figure 4:
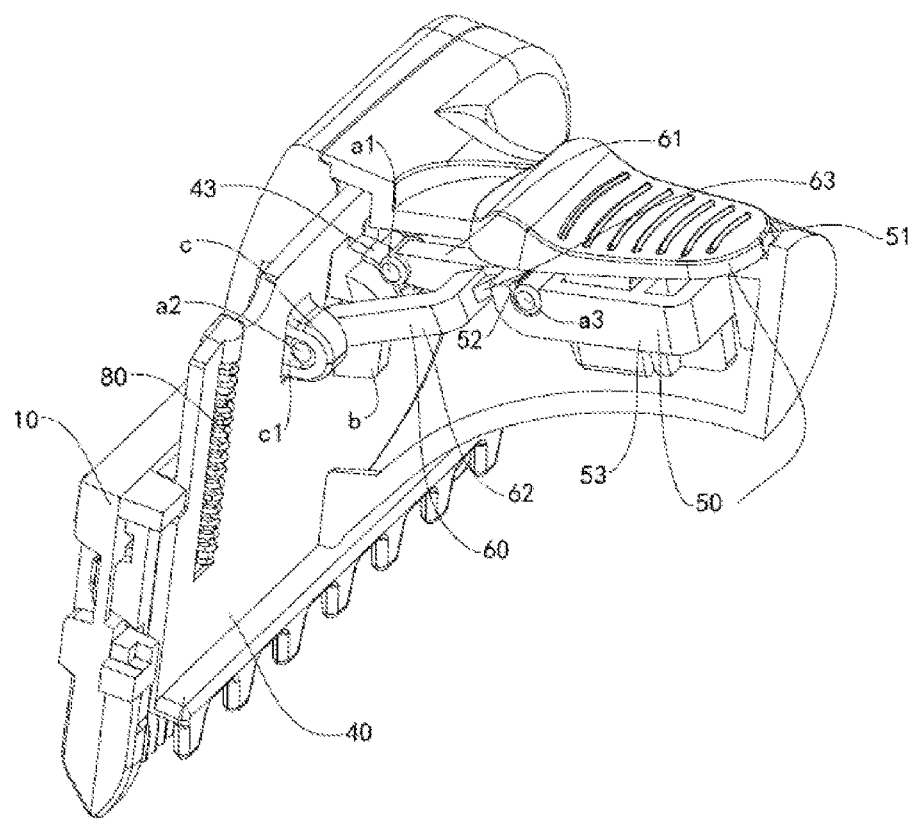
FIG. 4 is a view illustrating a structure of a head of a pet hair removal comb.
Figure 5:
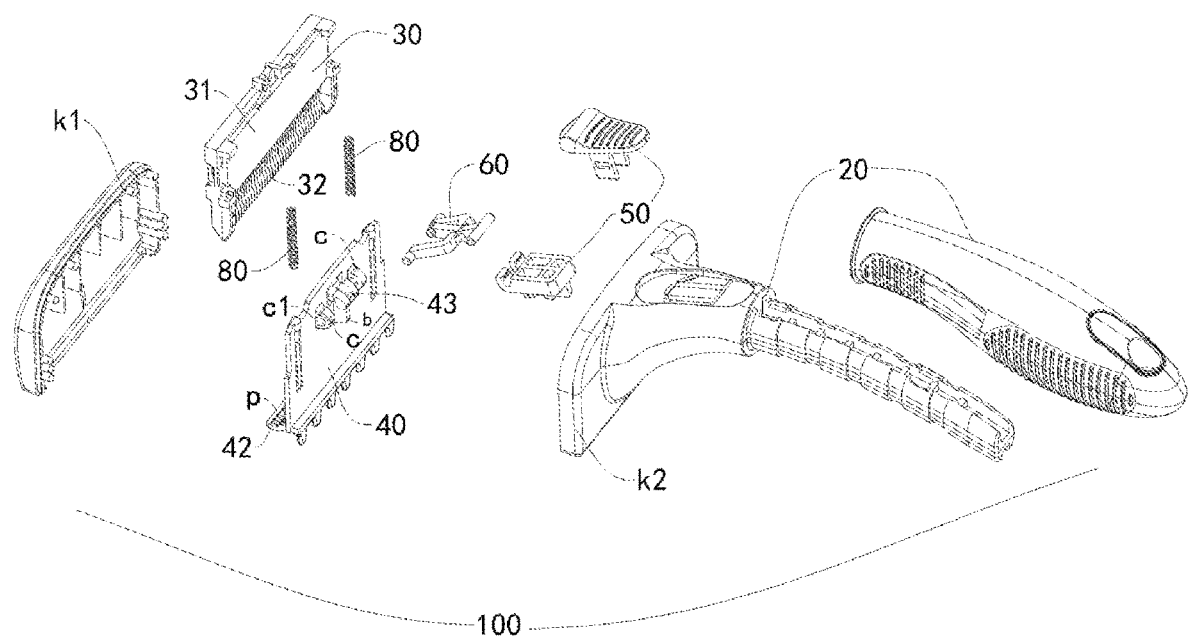
FIG. 5 is an exploded view of a pet hair removal comb.

FIGS. 1 to 3 show a pet hair removal comb 100 according to an embodiment of the present disclosure. The pet hair removal comb 100 includes a comb head 10 mounted with a knife holder assembly 30, and includes a handle assembly 20 and a hair removal push plate 40. The comb head 10 is mounted at a front end of the handle assembly 20. The hair removal push plate 40 is mounted on the comb head 10 and located at a back side of the knife holder assembly 30.

Figure 7:
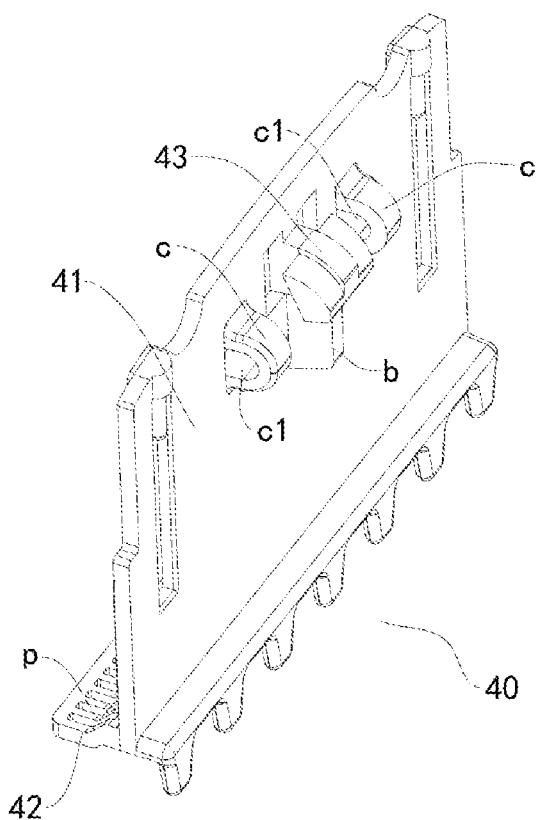
FIG. 7 is a view illustrating an overall structure of a hair removal push plate.
Figure 8:
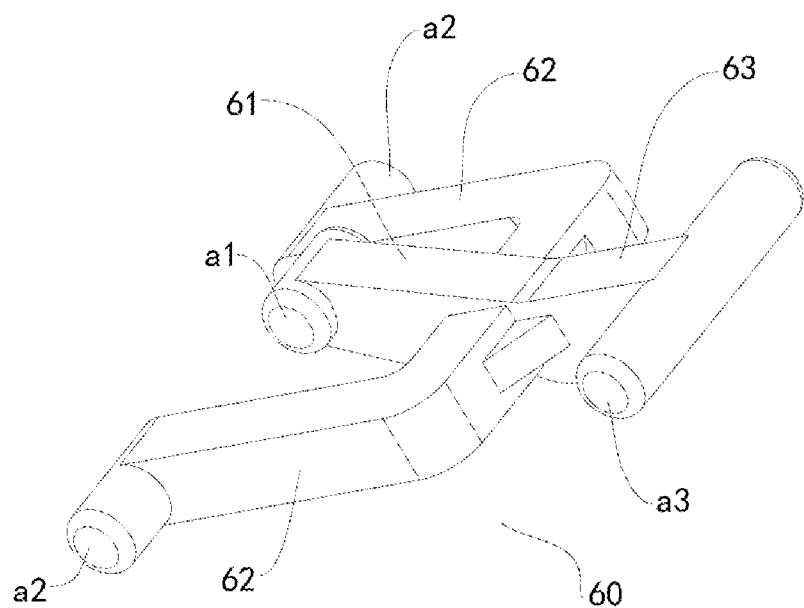
FIG. 8 is a view illustrating an overall structure of a connecting rod.
Figure 9:
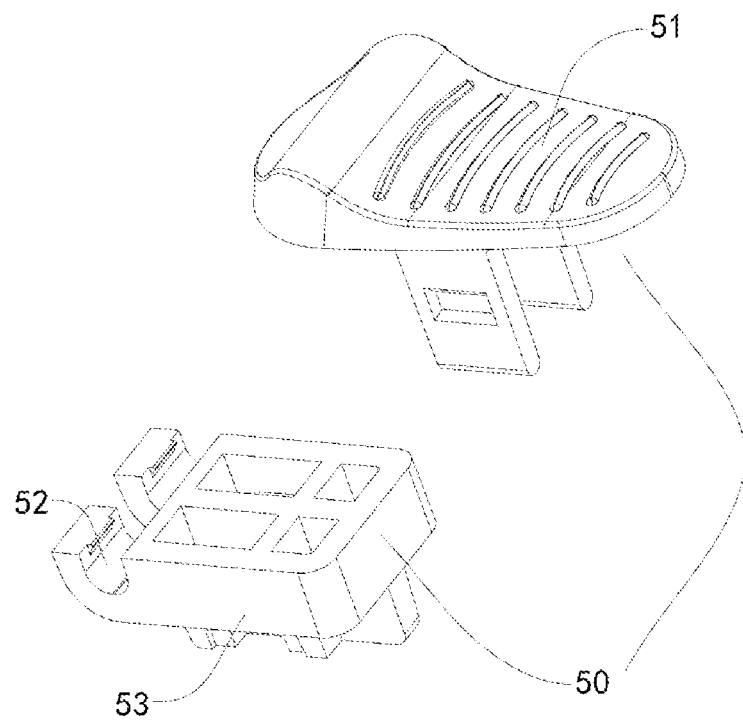
FIG. 9 is an exploded view of a button assembly.

The handle assembly 20 is provided thereon with a button assembly 50 that is slidable in front and back directions. As shown in FIG. 7, the hair removal push plate 40 includes a push plate 41 that is movable in up and down directions and a push part 42 provided at a front end of the push plate 41.

A connecting rod 60 is provided between the button assembly 50 and a back surface of the push plate 41. Two ends of the connecting rod 60 are respectively movably connected with the button assembly 50 and the push plate 41. The button assembly 50 slides to push the push plate 41 to move, through the connecting rod 60.

As shown in FIGS. 2 and 3, the connecting rod 60 is arranged with a force applying arm 61. A back surface of the hair removal push plate 40 is provided with an arc force-bearing surface 43. A front end of the force applying arm 61 is pressed tightly on the arc force-bearing surface 43. When the button assembly 50 slides forward and backward, the front end of the force applying arm 61 is slidable in close contact on the arc force-bearing surface 43.

The connecting rod 60 is arranged with a force applying arm 61 between the button assembly 50 and the push plate 41, and the front end of the force applying arm 61 is pressed tightly on the arc force-bearing surface 43 of the push plate 40. When the button assembly 50 slides forward and backward, the front end of the force applying arm 61 is slidable in close contact on the arc-bearing arc surface 43, such that the action on the button assembly 50 is transmitted to the hair removal push plate 40 without delay. Therefore, the present disclosure achieves timely response and improves the user's experience of using the pet hair removal comb.

Because the force applying arm 61 bears part of the force of the connecting rod 60 on the push plate 40, the process of driving the push plate through the connecting rod 60 by the button assembly 50 is more effort-saving. Especially when the button assembly 50 is in a starting position, the effort-saving effect is more obvious. As the inclination of the connecting rod 60 and the force applying arm 61 increases, the effort-saving effect decreases.

Specifically, as shown in FIGS. 2, 3 and 8 to 10, the front end of the force applying arm 61 is provided with a first cylinder a1; the first cylinder 1 is tightly pressed on the arc force-bearing surface 43. A boss b is provided on the back surface of the push plate 41, and the arc force-bearing surface 43 is provided on the boss b. Specifically, the boss b is located at a central position between two coupling sockets c. The height of the boss b is greater than that of the coupling socket c, such that the first cylinder a1 provided on the force applying arm 61 is disposed more backward than a second cylinder a2 provided on a connecting arm 62. That is, the force applying arm 61 is shorter than the connecting arm 62.

The connecting rod 60 includes two connecting arms 62 and a back arm 63. The force applying arm 61 is located at a central position between the two connecting arms 62. A front end of the connecting arm 62 is provided with the second cylinder a2. A back end of the back arm 63 is provided with a third cylinder a3. The second cylinder a2 passes through a coupling hole c1 of the coupling socket c provided on the back surface of the push plate 41. The third cylinder a3 is engaged in a groove 52 of the button assembly 50.

The force applying arm 61 and the connecting rod 60 are integrally molded, and the second cylinder a2 provided on the connecting arm 62 is inserted in the coupling hole c1. When the button assembly 50 pushes the connecting rod 60, the second cylinder a2 is rotated relative to the coupling socket c. Therefore, it is necessary to enable the second cylinder a2 to have a certain amount of gap movement in the coupling hole c1. The amount of gap movement enables the delayed response of the button assembly 50 to push the push plate 41, and it is the core element of the first cylinder a1 on the force applying arm 61 that closely contacts the arc force-bearing surface 43. This allows the button assembly 50 to push the push plate 41 through the force applying arm 61 without a gap, thereby realizing the timely response of the button assembly 50 to control the hair removal push plate 40, which improves the user's experience of using the comb.

As shown in FIGS. 2, 3, 9 and 10, the button assembly 50 includes a button 51 slidable on a surface of the handle assembly 20, and a connecting lock member 53. The button 51 is connected with the connecting lock member 53. The groove 52 is provided on the connecting lock member 53.

The third cylinder a3 on the back arm 63 is engaged in the groove 52 of the connecting lock member 53. When the button assembly 50 is pushed, the connecting rod 60 is pivoted, and the third cylinder a3 can rotate relative to the groove 52 of the connecting lock member 53.

Figure 10:
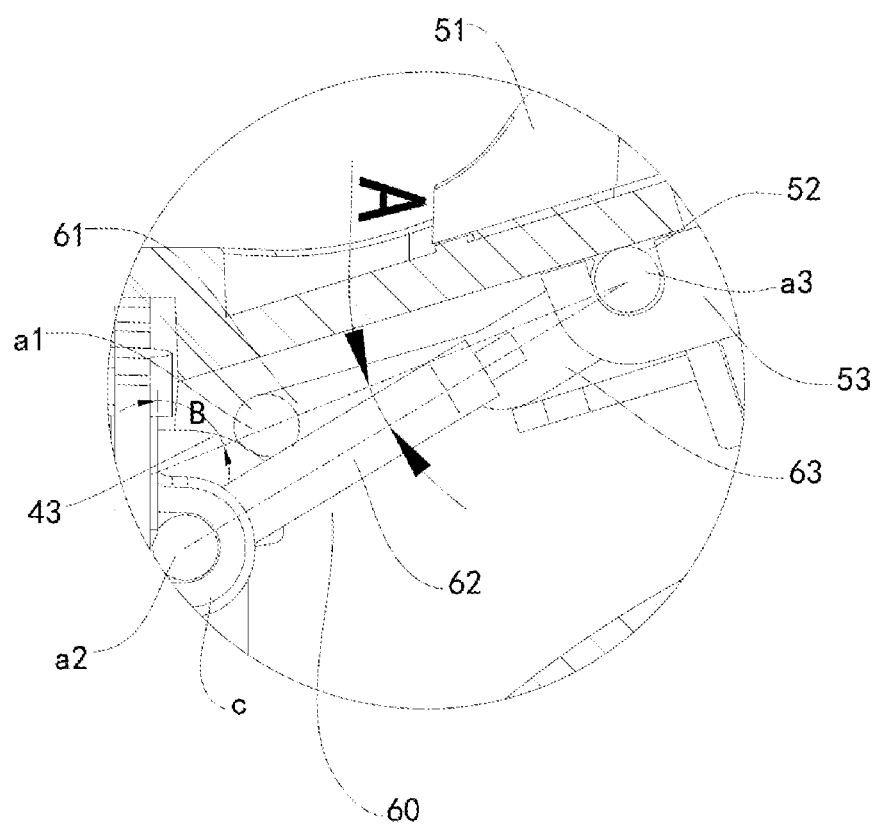
FIG. 10 is an enlarged view illustrating D in FIG. 2.

As shown in FIG. 10, the front end of the force applying arm 61 is located above the front end of the connecting rod 60. A connecting line of a center point of the first cylinder a1 and a center point of the third cylinder a3 and a connecting line of a center point of the second cylinder a2 and the center point of the third cylinder a3 define an angle A. The connecting line of the center point of the first cylinder a1 and the center point of the third cylinder a3 and a longitudinal movement trajectory line of the push plate 41 define an angle B. When the push plate 41 moves downward to push out the hair, the angle B gradually decreases. The arc force-bearing surface 43 and the second cylinder a2 have the same center. Through this structure, the first cylinder a1 disposed at the front end of the force applying arm 61 can always be in contact with the arc force-bearing surface 43. When the push plate 41 and the connecting arm 62 are displaced, the force applying arm 61 will not interfere with the connecting arm 62.

In addition, it should be noted that when the button 51 of the button assembly 50 moves at a constant speed from a starting point to an end point, the moving speed of the push plate 41 gradually decreases. As the angle B gradually decreases, the component force applied by the force applying arm 61 to the push plate gradually increases, which will cause the button 51 to require a slightly larger push force at the starting point and a slightly smaller push force in a position approaching the end point.

During the movement of the connecting rod 60, the first cylinder a1 on the force applying arm 61 contacts with the arc force-bearing surface 43 on the hair removal push plate 40 and applies a push force on the arc force-bearing surface 43. The second cylinder a2 serves as a positioning point and does not directly participate in the action of pushing the push plate 41. When the push plate 41 moves downward, the third cylinder a3 rotates in the groove 52. As the angle B gradually decreases, the push force required to be applied to the button 51 gradually decreases.

In addition, as the push plate 41 moves downward, a resilience force applied by a return spring 80 on the push plate 41 gradually increases, thereby reconciling the gradual decrease in the force of the force applying arm 61 in the above analysis. In the end, the force applied by the user to push the button 51 is basically the same, which further improves the stability of the push force applied by the user to push the button, thereby improving the comfort of the user pushing the button.

The comb head 10 includes a shell 11. Two return springs 80 are arranged between the shell 11 and the push plate 41. When the force applied by the user to the button assembly 50 is removed, the push plate 41 will return to an initial position under the action of the return springs 80.

Figure 6:
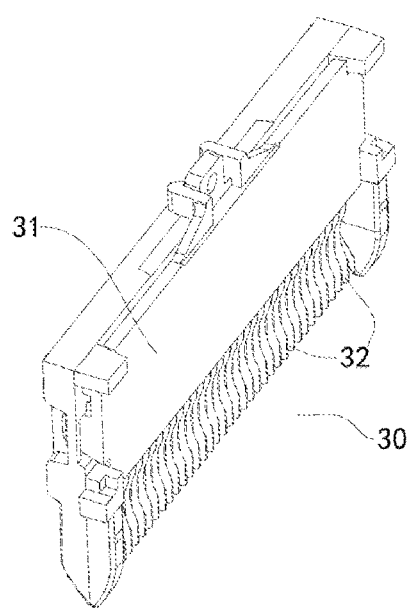
FIG. 6 is a view illustrating an overall structure of a knife holder assembly.

Preferably, as shown in FIG. 6, the knife holder assembly 30 in this embodiment includes a plate-shaped base 31 and a row of strip-shaped metal comb teeth 32 at a front end of the plate-shaped base 31.

As shown in FIG. 7, the push part 42 includes a gap push part p for removing hair from gaps between the comb teeth. The downward movement of the push part 42 can remove the pet hair stuck between the strip-shaped comb teeth 32.

The shell 11 includes a bottom shell k2 connected with the handle assembly 20, and a head cover k1. The bottom shell k2 and the head cover k1 are fixed by a fastener.

The pet hair removal comb provided by the present disclosure is described in detail above. The principle and implementation of the present disclosure are illustrated with reference to the examples. The description of the above embodiment is only used to help understand the present disclosure and the core concept. It should be noted that several modifications and changes may be made by persons of ordinary skill in the art without departing from the principle of the present disclosure, and these modifications and changes should also fall within the protection scope of the present disclosure.

What is claimed is:

1. A pet hair removal comb, comprising a comb head mounted with a knife holder assembly, a handle assembly and a hair removal push plate, wherein the comb head is mounted at a front end of the handle assembly; the hair removal push plate is mounted on the comb head and located at a back side of the knife holder assembly;
    the handle assembly is provided thereon with a button assembly that is slidable in front and back directions; the hair removal push plate comprises a push plate that is movable in up and down directions and a push part provided at a front end of the push plate;
    a connecting rod is provided between the button assembly and a back surface of the push plate; two ends of the connecting rod are respectively movably connected with the button assembly and the push plate; the button assembly is configured to slide to push, through the connecting rod, the push plate to move;
    the connecting rod is arranged with a force applying arm; a back surface of the hair removal push plate is provided with a force-bearing surface, wherein the force-bearing surface is arc-shaped; a front end of the force applying arm is in contact with the force-bearing surface; when the button assembly slides forward and backward, the front end of the force applying arm is slidably in contact with the force-bearing surface,
    wherein the front end of the force applying arm is provided with a first cylinder and the first cylinder is in contact with the force-bearing surface.

2. A pet hair removal comb, comprising a comb head mounted with a knife holder assembly, a handle assembly and a hair removal push plate, wherein the comb head is mounted at a front end of the handle assembly; the hair removal push plate is mounted on the comb head and located at a back side of the knife holder assembly;
    the handle assembly is provided thereon with a button assembly that is slidable in front and back directions; the hair removal push plate comprises a push plate that is movable in up and down directions and a push part provided at a front end of the push plate;
    a connecting rod is provided between the button assembly and a back surface of the push plate; two ends of the connecting rod are respectively movably connected with the button assembly and the push plate; the button assembly is configured to slide to push, through the connecting rod, the push plate to move;

the connecting rod is arranged with a force applying arm; a back surface of the hair removal push plate is provided with an arc force-bearing surface; a front end of the force applying arm is in contact with the arc force-bearing surface; when the button assembly slides forward and backward, the front end of the force applying arm is slidably in contact with the arc force-bearing surface, wherein the connecting rod comprises two connecting arms and a back arm; the force applying arm is located at a central position between the two connecting arms; a front end of each of the connecting arms is provided with a first cylinder; a back end of the back arm is provided with a second cylinder; the first cylinder passes through a coupling hole of a coupling socket provided on the back surface of the push plate; the second cylinder is engaged in a groove of the button assembly.

3. The pet hair removal comb according to claim 2, wherein the button assembly comprises a button slidable on a surface of the handle assembly, and a connecting lock member; the button is connected with the connecting lock member; the groove is provided on the connecting lock member.

4. The pet hair removal comb according to claim 2, wherein the front end of the force applying arm is located above a front end of the connecting rod; a connecting line of a center point of a third cylinder and a center point of the second cylinder and a connecting line of a center point of the first cylinder and the center point of the second cylinder define an angle A.

5. The pet hair removal comb according to claim 1, wherein the comb head comprises a shell; two return springs are arranged between the shell and the push plate.

6. The pet hair removal comb according to claim 1, wherein the knife holder assembly comprises a plate-shaped base and a row of strip-shaped metal comb teeth provided at a front end of the plate-shaped base.

7. The pet hair removal comb according to claim 6, wherein the push part comprises a gap push part for removing hair from gaps between the comb teeth.

8. The pet hair removal comb according to claim 5, wherein the shell comprises a bottom shell connected with the handle assembly, and a head cover; the bottom shell and the head cover are fixed by a fastener.

* * * * *